US009266772B2

(12) United States Patent
Cadet et al.

(10) Patent No.: US 9,266,772 B2
(45) Date of Patent: Feb. 23, 2016

(54) METHOD FOR MANUFACTURING A SUBSTRATE COATED WITH MESOPOROUS ANTISTATIC FILM, AND USE THEREOF IN OPHTHALMIC OPTICS

(75) Inventors: Mamonjy Cadet, Charenton le Pont (FR); Mathieu Feuillade, Charenton le Pont (FR)

(73) Assignee: Essilor International (Compagnie Generale d'Optique), Charenton-le-Pont (FR)

( * ) Notice: Subject to any disclaimer, the term of this patent is extended or adjusted under 35 U.S.C. 154(b) by 684 days.

(21) Appl. No.: 13/390,316

(22) PCT Filed: Aug. 12, 2010

(86) PCT No.: PCT/FR2010/051706
§ 371 (c)(1),
(2), (4) Date: Feb. 13, 2012

(87) PCT Pub. No.: WO2011/018590
PCT Pub. Date: Feb. 17, 2011

(65) Prior Publication Data
US 2012/0141770 A1    Jun. 7, 2012

(30) Foreign Application Priority Data
Aug. 13, 2009  (FR) ..................... 09 55670

(51) Int. Cl.
*C03C 17/30* (2006.01)
*C01B 33/145* (2006.01)
(Continued)

(52) U.S. Cl.
CPC ............... *C03C 17/30* (2013.01); *C01B 33/145* (2013.01); *C01B 33/149* (2013.01); *C01B 37/02* (2013.01);
(Continued)

(58) Field of Classification Search
CPC ........................................................ B05D 5/00
See application file for complete search history.

(56) References Cited

U.S. PATENT DOCUMENTS

| 6,852,406 B2 | 2/2005 | Marechal et al. ............. 428/336 |
| 2002/0046682 A1* | 4/2002 | Fan et al. ................. 106/287.11 |

(Continued)

FOREIGN PATENT DOCUMENTS

| EP | 0 834 092 | 4/1998 |
| FR | 2 787 350 | 6/2000 |

(Continued)

OTHER PUBLICATIONS

Wong et al., Preparation of Quaternary Ammonium Organosilane Functionalized Mesoporous Thin Films, Langmuir, 2002, 18, 972-974.*

(Continued)

*Primary Examiner* — James M Mellott
(74) *Attorney, Agent, or Firm* — Norton Rose Fulbright US LLP

(57) ABSTRACT

The present invention relates to an article comprising a substrate having a main surface coated with a mesoporous antistatic coating, said coating having a refractive index lower than or equal to 1.5, and a silica based matrix functionalized by ammonium groups, said matrix having a hydrophobic character. Under certain conditions, the mesoporous antistatic coating is a single-layer anti-reflection coating or is part of a multi-layer anti-reflection coating.
This invention further relates to a method for manufacturing said article, and to the use of a mesoporous coating having a silica based matrix functionalized by ammonium groups, as an antistatic coating.

15 Claims, 1 Drawing Sheet

(51) Int. Cl.

| | | |
|---|---|---|
| C01B 33/149 | (2006.01) | |
| C01B 37/02 | (2006.01) | |
| C03C 1/00 | (2006.01) | |
| C09D 183/04 | (2006.01) | |
| C09D 183/08 | (2006.01) | |
| C09K 3/16 | (2006.01) | |
| G02B 1/04 | (2006.01) | |
| G03B 3/00 | (2006.01) | |
| B05D 5/00 | (2006.01) | |
| C08G 77/26 | (2006.01) | |

(52) U.S. Cl.
CPC .............. *C03C 1/008* (2013.01); *C09D 183/04* (2013.01); *C09D 183/08* (2013.01); *C09K 3/16* (2013.01); *G02B 1/043* (2013.01); *G03B 3/00* (2013.01); *B05D 5/00* (2013.01); *C03C 2217/73* (2013.01); *C03C 2217/76* (2013.01); *C03C 2218/113* (2013.01); *C08G 77/26* (2013.01); *Y10T 428/249969* (2015.04)

(56) References Cited

U.S. PATENT DOCUMENTS

| 2002/0114960 | A1 | 8/2002 | Mager et al. .................. 428/447 |
| 2003/0157311 | A1 | 8/2003 | MacDougall et al. ..... 428/304.4 |
| 2004/0209007 | A1 | 10/2004 | Satake et al. .................. 428/1.3 |

FOREIGN PATENT DOCUMENTS

| JP | 2008-280193 | 11/2008 |
| JP | 2009-040967 | 2/2009 |
| WO | WO 2006/021698 | 3/2006 |
| WO | WO 2007/088312 | 8/2007 |
| WO | WO 2007/090983 | 8/2007 |

OTHER PUBLICATIONS

Andrzejewska, et al., Adsorption of organic dyes on the aminosilane modified TiO2 surface, Dyes and Pigments, 62 (2004) 121-130.*
Cagnol, et al., "A general one-pot process leading to highly functionalised ordered mesoporous silica films," *Chem. Commun.*, pp. 1742-1743, 2004.
Calvo, et al., "Mesoporous aminopropyl-functionalized hybrid thin films with modulable surface and environment-responsive behavior," *Chem. Mater.*, 20:4661-8, 2008.
Liu, et al., "Synthesis and characterization of highly ordered functional mesoporous silica thin films with positively chargeable -NH2 groups," *Chem Commun.*, pp. 1146-1147, 2003.
Wong, et al., "Preparation of quaternary ammonium organosilane functionalized mesoporous thin films," *Langmuir*, 18:972-4, 2002.
Wong, et al., "Hybrid organic-inorganic quaternary ammonium organosilane functionalized mesoporous thin firms," *J. Phys. Chem. B*, 106:6652-8, 2002.
Zhang, et al., "Preparation of amino-functionalized mesoporous silica thin films with highly ordered large pore structures," *J. Sol. Gel Sci. Technol.*, 43:305-11, 2007.

\* cited by examiner

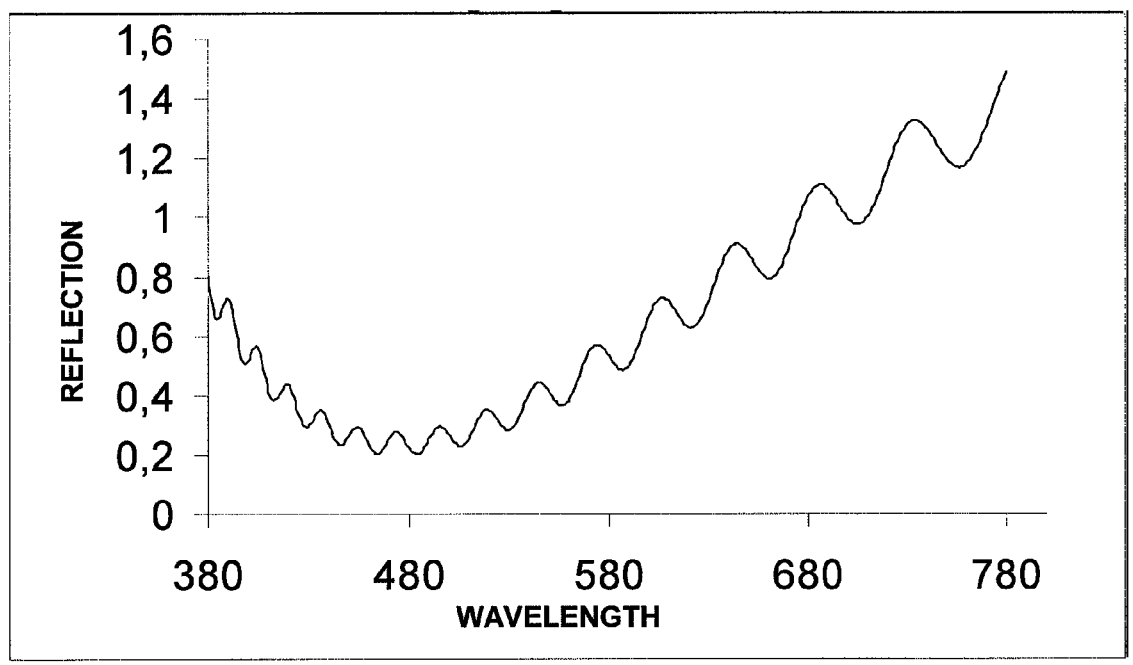

METHOD FOR MANUFACTURING A SUBSTRATE COATED WITH MESOPOROUS ANTISTATIC FILM, AND USE THEREOF IN OPHTHALMIC OPTICS

This application is a national phase application under 35 U.S.C. §371 of International Application No. PCT/FR2010/051706 filed 12 Aug. 2010, which claims priority to French Application No. 0955670 filed 13 Aug. 2009. The entire text of each of the above-referenced disclosures is specifically incorporated herein by reference without disclaimer.

The present invention generally relates to sol-gel mesoporous coatings having a silica based matrix with a low refractive index, which in addition possess antistatic properties as a result of the presence of ammonium groups within the structure thereof, and to methods for manufacturing such coatings. They are mainly intended to be provided on substrates in organic or mineral glass, especially in the ophthalmic optics field.

Increasingly, the trend is seeking to functionalize items made from mineral or organic glass, by depositing onto the surface thereof coatings that are a few nanometers or micrometers thick in order to impart the same a given property depending on the intended use. Thus, anti-reflection, abrasion-resistant, scratch-resistant, impact-resistant, anti-fogging, anti-fouling or antistatic layers can be provided.

It is well known that optical items, made from substantially insulating materials, have a tendency to build up static electricity charges onto their surface, especially when cleaned under dry conditions by rubbing the surface thereof using a wiping cloth, a piece of synthetic foam or polyester (triboelectricity). Charges that are present on the surface generate an electrostatic field capable of drawing and fixing very low weight-elements that are close at hand (few centimeters), generally small-sized particles such as dust, and this lasts as long as the charge remains on the item.

To reduce or prevent such particle attraction, the electrostatic field intensity should be decreased, that is to say the number of static charges present on the item's surface should be reduced. This may be obtained by making the charges mobile, for example by introducing a layer made of a material inducing amongst the "charge carriers" a high mobility. Materials inducing the highest mobility are conductive materials. Thus, a highly conductive material can disperse charges more rapidly.

The state of the art reveals that an optical item may acquire antistatic properties by incorporating onto its surface, within the functional coating stack, at least one electrically conductive layer, or "antistatic layer", both expressions being used indifferently.

Such antistatic layer most often may form the outer layer of the functional coating stack, an intermediate layer (inner layer) or be deposited directly onto the optical item substrate.

As used herein, "antistatic" is defined as the ability to retain and/or to develop a substantial electrostatic charge. An item is generally considered as possessing acceptable antistatic properties insofar as it does neither draw nor fix dust or small particles after one of its surfaces has been rubbed using a suitable wiping cloth. It can quickly disperse any accumulated electrostatic charge, so that such an item seems to be "cleaner" after wiping.

The ability for a glass to disperse a static charge resulting from the rubbing using a cloth or any other suitable method for generating an electrostatic charge (through corona discharge, . . . ) may be quantified by measuring the time necessary for said charge to be dispersed. Typically, a glass can be considered as being antistatic when the discharge time is less than or equal to 500 milliseconds. In the present application, a glass is considered as being antistatic when the discharge time thereof is less than or equal to 200 milliseconds.

Known antistatic coatings comprise at least one antistatic agent, which is generally an optionally doped (semi-)conductive metal oxide, such as tin-doped indium oxide (ITO), antimony-doped tin oxide, vanadium pentoxide, or a conjugated structure-conductive polymer.

A number of patent applications (US 2004/0209007, US 2002/0114960 . . . ) describe items provided with an antistatic layer based on conductive polymers deposited directly onto the substrate of the item and independent from the anti-reflection coating. However, conductive polymers are much more expensive than conductive metal oxides. Moreover their presence increases the refractive index and the coating absorption.

The patents EP 0,834,092 and U.S. Pat. No. 6,852,406 describe optical items, especially ophthalmic lenses, provided with an anti-reflection stack which is mineral in nature comprising a transparent, indium-tin oxide-(ITO) or tin oxide-based, antistatic layer, mineral in nature, deposited under vacuum. However, ITO-based antistatic layers do not give fully satisfactory results. As a drawback, they do suffer from non negligibly absorbing in the visible range, so that their thickness has to be relatively low so as not to be detrimental to the transparency properties of an optical item. Moreover, these layers have high refractive indices, generally higher than 1.8.

It would be advisable to provide antistatic coatings possessing lower refractive indices, especially lower than 1.5.

Preparing mesoporous coatings having a silica based matrix possessing a low refractive index due to their high porosity is well known and has been described for instance in the applications WO 2006/021698, WO 2007/088312 and WO 2007/090983, in the applicant's name.

The Japanese applications JP 2008-280193 and JP 2009-040967 describe structured mesoporous coatings with a silica matrix functionalized by $NH_2$ groups, obtained through co-hydrolysis of a tetraalkoxysilane precursor and of an alkoxysilane precursor carrying at least one amino group, typically tetraethoxysilane and 3-aminopropyltriethoxysilane, in the presence of a base and a cationic pore-forming agent selected from surfactants comprising a quaternary ammonium group. The coating may optionally undergo a functionalization reaction of the amino groups before or after extraction of the pore-forming agent, by reacting with an organic compound which carries groups that do react towards the amino groups such as vinyl, carboxy, epoxy or isocyanate groups. The coatings are 50 to 150 nm thick, have a low refractive index (1.33-1.36), and are poorly conductive.

Publications Langmuir 2002, 18, 972-974, J. Sol Gel Sci. Technol. 2007, 43, 305-311, J. Phys. Chem. B 2002, 106, 6652-6658, Chem. Mater. 2008, 20, 4661-4668, Chem. Commun. 2003, 1146-1147 and Chem. Commun. 2004, 1742-1743 describe the preparation of mesoporous coatings having a silica-based- or a polysiloxane based-matrix functionalized by ammonium groups. They are obtained by co-condensating in acidic medium a tetraalkoxysilane- or a bis(trialkoxysilane)-bridged precursor (tetraethoxysilane TEOS or bis-(triethoxysilyl)ethane BTSE) and an alkoxysilane precursor carrying at least one amino or ammonium group (3-aminopropyltriethoxysilane or N-trimethoxysilylpropyl-N,N,N-trimethylammonium chloride) and a pore-forming agent, followed with the removal through extraction or thermal treatment of the pore-forming agent. When an amino group-carrying alkoxysilane precursor is used, an acid sufficient amount should be used so as to protonate the amino group and thus to slow down the condensation reaction of the gel-forming silanes. The pore-forming agent is generally a non ionic agent, of the ethylene oxide and propylene oxide block copolymer type or of the polyethylene glycoalkyl monoether type, but it may also be an ionic agent (cetyltrimethylammonium bromide). Both precursors are generally used according to following mole ratio: TEOS to organosilane carrying one ammonium group=1:0.05-0.667.

These mesoporous coatings having a silica based matrix functionalized by amino or ammonium groups as a drawback are sensitive to moisture since water may be easily adsorbed within the pores of the material.

It is thus an object of the present invention to provide a transparent optical item, especially an ophthalmic lens, possessing both antistatic properties and a low refractive index.

It is a further object of the present invention to provide an optical item, the antistatic properties of which are stable over time, which would not be prone to water absorption, would optionally have antireflection properties, good mechanical properties, and would retain outstanding adhesion properties of the different coating layers to each other.

The applicant discovered that some mesoporous coatings having a silica based matrix can be used as antistatic coatings, but also as low refractive index layers in an anti-reflection coating.

The present invention relates to the use of a mesoporous coating possessing a silica based matrix functionalized by ammonium groups, as an antistatic coating.

Furthermore, the present invention relates to an item comprising a substrate having a main surface coated with a mesoporous antistatic coating, said coating having a refractive index lower than or equal to 1.45, more preferably lower than or equal to 1.40, and a silica based matrix functionalized by ammonium groups, which has a hydrophobic character.

Lastly, the present invention relates to a method for manufacturing a substrate coated with a mesoporous antistatic film, comprising:
a) the preparation of a precursor sol of a mesoporous antistatic film comprising:
  at least one inorganic precursor agent A selected from compounds of formula:

$$Si(X)_4 \qquad (I)$$

wherein the X groups, being the same or different, are hydrolyzable groups preferably selected from alkoxy, acyloxy and halogen groups, preferably alkoxy, or a hydrolyzate of such precursor agent;
  at least one precursor agent B selected from organosilanes comprising:
    α) a silicon atom carrying at least two hydrolyzable groups; and
    β) at least one ammonium group;
    or a hydrolyzate of such precursor agent;
  at least one organic solvent, at least one pore-forming agent, water and optionally a hydrolysis catalyst for the X groups;
  the B compound/A compound molar ratio ranging from 0.1 to 0.8;
b) the deposition of a precursor sol film onto a substrate main surface;
c) the consolidation of the deposited film;
d) the removal of the pore-forming agent from the film resulting from the previous step and the recovery of a mesoporous antistatic film having a refractive index less than or equal to 1.5;

the method further comprising:
  (i) a step of treating the film after step b) or, whenever present, after step c), using at least one hydrophobic reactive compound carrying at least one hydrophobic group; and/or
  (ii) a step of introducing at least one hydrophobic precursor agent carrying at least one hydrophobic group into the precursor sol before the step b) of depositing the film of the precursor sol.

The present invention will be described in more details by referring to the appended drawing, wherein FIG. 1 shows the reflection coefficient evolution for a coating of the invention between 380 and 780 nm.

In the present application, the mesoporous materials (coatings or films) are defined as solids comprising within the structure thereof pores with a size ranging from 2 to 50 nm, called mesopores, that is to say that at least part of their structure comprises mesopores. These have preferably a size ranging from 3 to 30 nm. Such a pore size is intermediate between the one of macropores (size'>50 nm) and the one of micropores (size <2 nm, materials of the zeolite type). These definitions are those of the IUPAC Compendium of Chemistry Terminology, $2^{nd}$ Ed., A. D. McNaught and A. Wilkinson, R S C, Cambridge, UK, 1997.

The mesopores may be empty, that is to say filled with air, or be only partly empty.

Mesoporous materials and their preparation have been widely described in the literature, especially in Science 1983, 220. 365371 or The Journal of Chemical Society, Faraday Transactions 1985, 81, 545-548.

Mesoporous materials may be structured. A structured material is defined in the present application as a material comprising an organized structure, characterized more specifically by the presence of at least one diffraction peak in a diffraction pattern of X-rays or neutrons, which is associated with a repetition of a distance that is specific to the material, called spatial repetition period of the structured system.

As used herein, a mesostructured material is intended to mean a structured material having a spatial repetition period ranging from 2 to 70 nm, preferably from 2 to 50 nm.

In the present application, a mesostructured material is defined as a structured material with a spatial repetition period ranging from 2 to 70 nm, preferably from 2 to 50 nm.

Structured mesoporous materials are a specific class of mesostructured materials. These are mesoporous materials with an organized spatial arrangement of the mesopores that are present in the structure thereof, leading therefore to a spatial repetition period.

The traditional method for preparing mesoporous (optionally structured) films is the sol-gel process. It comprises the preparation of a not much polymerized sol based on an inorganic material obtained from one or more precursors that were co-hydrolyzed most of the time in an acidic medium, in the presence of a pore-forming agent. This sol also contains water, an organic solvent typically polar in nature such as ethanol, and optionally a hydrolysis and/or a condensation catalyst.

A film made from such precursor sol is then deposited onto a support main surface, and the deposited film is thermally consolidated. Removing the pore-forming agent, when used in a sufficient amount, provides a mesoporous film.

When the pore-forming agent is an amphiphilic agent, for example a surfactant, it acts as a structuring agent and typically leads to structured materials.

The pore size in the end material depends on the size of the pore-forming agent which is entrapped or encapsulated within the silica network. When a surfactant is used, the pore size in the solid is relatively large because the silica network relies on micelles, that is to say on colloidal particles, formed by the surfactant. Inherently, micelles are larger than their components, so that using a surfactant as a pore-forming agent typically produces a mesoporous material, if the surfactant is used with a high enough concentration.

When the pore-forming agent is not an amphiphilic agent, it does not typically form micelles under these reaction conditions and does not typically result in structured materials.

Once the inorganic network is formed around the mesopores that contain the pore-forming agent, such pore-forming agent may be removed from the material, thus typically leading to a mesoporous material. In the present application, a material may be referred to as being mesoporous as soon as the pore-forming agent used for preparing the same has been removed at least partially from at least one part of this material, that is to say at least one part of this material comprises mesopores that are at least partially empty.

Mesoporous films which do not comprise a pore-forming agent anymore and the pores of which have not been filled with other compounds have pores that are said to be "empty", that is to say filled with air, and possess the properties resulting therefrom, i.e. especially a low refractive index.

The matrix forming the mesoporous coating, comprising —Si—O—Si— chain members is a silica-based matrix, functionalized by ammonium groups.

As used herein, a silica based matrix means a matrix obtained from a composition containing a precursor comprising at least one silicon atom bound to 4 hydrolyzable (or hydroxyl) groups.

The matrix forming the mesoporous coating is also generally a polysiloxane matrix, comprising hydrocarbon groups bound to silicon atoms, said hydrocarbon groups carrying ammonium groups.

A suitable sol to be used in the present invention to form the silica-based mesoporous matrix functionalized by ammonium groups comprises:
at least one inorganic precursor agent A of formula:

$$Si(X)_4 \quad (I)$$

wherein the X groups, being the same or different, are hydrolyzable groups preferably selected from —O—R alkoxy, in particular $C_1$-$C_4$ alkoxy, —O—C(O)R acyloxy groups, wherein R is an alkyl radical, preferably a $C_1$-$C_6$ alkyl radical, preferably a methyl or an ethyl radical, and halogens such as Cl, Br and I and combinations of these groups; or a hydrolyzate of this precursor agent;
at least one precursor agent B selected from organosilanes comprising:
α) a silicon atom carrying at least two hydrolyzable groups; and
β) at least one ammonium group, the molar ratio B compound/A compound ranging from 0.1 to 0.8;
at least one organic solvent, at least one pore-forming agent, water and optionally a hydrolysis catalyst for the X groups.

Preferably, the X groups are alkoxy groups, and in particular methoxy or ethoxy, and more preferably ethoxy groups.

Preferred compounds (I) are tetraalkyl orthosilicates. Amongst them, tetraethoxysilane (or tetraethyl orthosilicate) $Si(OC_2H_5)_4$ abbreviated TEOS, tetramethoxysilane $Si(OCH_3)_4$ abbreviated TMOS, or tetra-isopropoxysilane $Si(OC_3H_7)_4$ abbreviated TPOS will be advantageously used, and preferably TEOS.

Inorganic precursor agents of formula (I) that are present in the sol generally account for 10 to 30% by weight of the total weight (including all other compounds that are present in the precursor sol, in particular the solvent) of the precursor sol.

The precursor agent B, co-condensed in the presence of the inorganic precursor agent A, is an organosilane comprising a silicon atom carrying at least two hydrolyzable groups, preferably three hydrolyzable groups, and at least one ammonium group.

As used herein, an ammonium group is intended to mean a group comprising a positively charged nitrogen atom, bound to carbon and/or hydrogen atoms.

In the context of the invention, any organosilane comprising one silicon atom carrying at least two hydrolyzable groups and at least one group providing an ammonium group under the working conditions is considered as being a precursor agent B.

Some ammonium group precursor groups may indeed provide in situ an ammonium group. The groups which are able to provide an ammonium group under the working conditions, generally acidic conditions, are for example protonable nitrogenated groups, such as amino groups ($NH_2$), primary, secondary and tertiary amine groups, or 2-pyridyl, 3-pyridyl or 4-pyridyl groups, which may provide pyridinium groups. A preferred precursor group for an ammonium group is an amino group. When such precursor groups are present in the B compounds, the precursor sol should comprise acid in a sufficient amount to fully protonate the ammonium group precursor groups.

The medium containing the precursor agents is typically an acidic medium, which acidic character is provided through addition, for example, of a mineral acid, typically HCl or an organic acid such as acetic acid, preferably HCl. Such an acid acts as a hydrolysis and condensation catalyst by catalyzing the hydrolysis of the hydrolyzable groups present in the precursor agents, and also enables to protonate the ammonium group precursor groups when present. A concentrated acid solution will be preferably used to make sure these precursor groups will be protonated.

The presence of ammonium groups in the B compounds is crucial. Without wishing to be bound by any theory, the inventors think that the antistatic properties of the mesoporous coating of the invention result from the presence of charged groups within the matrix, in this case ammonium groups and their counter-ions, which enable to disperse electrostatic charges.

The method of the invention does not comprise any treatment of the coating with a basic solution.

The ammonium group in the B compound may be a quaternary, tertiary, secondary or primary ammonium group, preferably a quaternary or primary, most preferably a quaternary group. The quaternary ammonium groups advantageously provide a stable, charged species within the matrix and are not or poorly sensitive to pH variations in the precursor sol.

The B compound is preferably a compound, or a hydrolyzate thereof, of formula:

$$R_n Y_m Si(X')_{4-n-m} \quad (II)$$

wherein the Y groups, being the same or different, are monovalent organic groups bound to silicon through a carbon atom and having at least one ammonium group, the X' groups, being the same or different, are hydrolyzable groups, R is a monovalent organic group bound to silicon through a carbon atom, n and m being integers such that m=1 or 2 with n+m=1 or 2. Preferably m=1. Even more preferably, n=0.

The X' groups may be selected from the groups previously described for the hydrolyzable X groups of the inorganic precursor agent A.

The group R is preferably a saturated or unsaturated hydrocarbon group, preferably a $C_1$-$C_{10}$ group and more preferably a $C_1$-$C_4$ group, for example an alkyl group, such as methyl or ethyl, a vinyl group, an aryl group, for example a phenyl group, optionally substituted, especially with one or more $C_1$-$C_4$ alkyl groups, or represent the fluorinated or perfluorinated analog groups of the previously mentioned hydrocarbon groups, for example fluoroalkyl or perfluoroalkyl groups. Preferably R is a methyl group.

The ammonium group is preferably located at the terminal position of the Y group.

The Y group is preferably a group of formula (III):

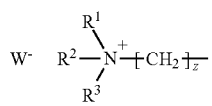

wherein z is an integer, ranging preferably from 2 to 20, more preferably from 2 to 5, most preferably is equal to 3, $R^1$, $R^2$ and $R^3$, independently from each other, represent hydrogen atoms, aryl groups, aralkyl groups or linear or branched alkyl groups, preferably linear, having preferably from 1 to 20 carbon atoms, more preferably from 1 to 10 carbon atoms, and even more preferably from 1 to 4 carbon atoms, and $W^-$ is an anion.

$W^-$ may represent, without limitation, a halogenide anion or a hydroxide, triflate, hydrogenosulfonate, hydrogenocarbonate or chlorate ion, a carboxylic acid anion such as an acetate ion. Preferably, $W^-$ represents a halogenide anion such as a fluoride ion, a chloride ion or a bromide ion, most preferably is a chloride ion.

As previously explained, the Y groups of formula (III) may be obtained in situ, for example from a protonable precursor group.

$R^1$, $R^2$ and $R^3$ represent, independently from each other, preferably alkyl groups such as methyl, ethyl, propyl or butyl groups, or hydrogen atoms, most preferably methyl groups.

The B compounds have preferably a molecular weight of less than 500 g/mol, more preferably of less than 300 g/mol.

In a preferred embodiment, the precursor agent B comprises a trialkoxysilyl group such as a triethoxysilyl or trimethoxysilyl group, and represents preferably a N-trialkoxysilylpropyl-N,N,N-trialkylammonium halogenide or a N-trialkoxysilylpropylamine halogen hydrate, for example a 3-aminopropyltrialkoxysilane halogen hydrate.

Specific examples of B compounds include N-trimethoxysilylpropyl-N,N,N-trimethylammonium chloride (TMAC), N-trimethoxysilylpropyl-N,N-didecyl-N-methyl ammonium chloride, N-trimethoxysilylpropyl-N,N-dimethyl-N-tetradecyl ammonium chloride, N-trimethoxysilylpropyl-N,N-dimethyl-N-octadecyl ammonium chloride and 3-aminopropyl triethoxysilane hydrochloride (APTES). Such compounds are especially marketed by the Gelest company.

Precursor agents B carrying an ammonium group present in the sol generally account for 1 to 15% by weight, preferably for 2 to 12% by weight, more preferably for 3 to 10% by weight relative to the precursor sol total weight. The molar ratio B compound/A compound does range from 0.1 to 0.8, preferably from 0.15 to 0.7. This means that the matrix main precursor is the inorganic agent A of formula $Si(X)_4$.

Suitable organic solvents or combinations of organic solvents for use in the preparation of the precursor sol according to the invention include all the solvents that are classically used, and more particularly polar solvents, especially alkanols such as methanol, ethanol, isopropanol, isobutanol, n-butanol and mixtures thereof. Other solvents, preferably water-soluble solvents, may be used, such as 1,4-dioxane, tetrahydrofurane or acetonitrile. Ethanol is the preferred organic solvent.

As a rule, the organic solvent accounts for 40 to 90% by weight relative to the precursor sol total weight. Water present in the precursor sol typically accounts for 5 to 40% by weight, preferably for 10 to 30% by weight of the precursor sol total weight.

The pore-forming agent in the precursor sol may be an amphiphilic or non amphiphilic pore-forming agent. Generally, it is an organic compound. It may be used alone or in admixture with other pore-forming agents.

Suitable non amphiphilic pore-forming agents to be used in the present invention include:

synthetic polymers such as ethylene polyoxides or ethers thereof, poly(alkylenoxy)alkyl-ethers and especially poly(ethylenoxy)alkyl-ethers, polyethylene glycols, diblock- or triblock-copolymers, preferably triblock copolymers, of ethylene oxide (PEO) and propylene oxide (PPO), gamma-cyclodextrin, lactic acid, and other biomaterials such as proteins or sugars such as D-glucose or maltose.

The pore-forming agent is preferably an amphiphilic agent of the surfactant type. A key characteristic of such a compound lies in its ability to form micelles in solution as a result of the solvent evaporation which concentrates the solution and thus provides a mesostructured film.

The surfactant compounds may be non ionic, cationic, anionic or amphoteric. Such surfactants are for most of them commercially available. The surfactant compounds for use in the present invention are those described in the application WO 2007/088312.

The pore-forming agent is preferably a non ionic agent. Preferably, the precursor sol of the mesoporous antistatic film does not comprise any ionic pore-forming agent, and in particular does not comprise cetyltrimethylammonium bromide (CTAB).

The preferred pore-forming agents are polyethylene glycol alkylmonoethers and to a lesser extent triblock-copolymers comprising two ethylene oxide blocks and a propylene oxide central block (PPO), called "poloxamers", marketed especially under the trade name Pluronic®, for example Pluronic P-123 or Pluronic F-127.

Preferred polyethylene glycol alkylmonoether-type pore-forming agents have the following formula:

wherein $R^1$ is a linear or branched alkyl group, optionally substituted with one or more functional groups, and which may furthermore comprise one or more double bonds, and n is an integer from 1 to 200, preferably from 2 to 150, more preferably from 2 to 100, even more preferably from 4 to 20, and most preferably from 8 to 12. $R^1$ is preferably a linear alkyl group with preferably from 10 to 20 carbon atoms, more preferably a saturated linear alkyl group. Non limiting examples of $R^1$ groups to be suitably used include dodecyl ($C_{12}H_{25}$), cetyl ($C_{16}H_{33}$), stearyl ($C_{18}H_{37}$) and oleyl ($C_{18}H_{35}$) groups.

n may especially be equal to 2, 4, 5, 10, 20, 23 or 100.

The pore-forming agents of formula (IV) have preferably a molecular weight ranging from 180 to 5000 g/mol, more preferably from 300 to 1500 g/mol and even more preferably from 350 to 1000 g/mol.

The preferred pore-forming agent of formula (IV) is polyoxyethylene (10) cetylether (n=10, $R^1$=n-$C_{16}H_{33}$).

Compounds of formula (IV) for use in the present invention are marketed by the ICI company under the trade name Brij®, for example Brij® with following references: 30, 35, 52, 56, 58, 76, 78, 92, 97, 98, 700. Amongst them, Brij® 56 is the most preferred (compound of formula IV with n~10 and $R^1$=n-$C_{16}H_{33}$).

As a rule, the pore-forming agent accounts for 2 to 10% of the precursor sol total weight. Typically, the molar ratio of pore-forming agents used to the precursor agents of formula (I) which are added to the precursor sol does vary from 0.01 to 5. preferably from 0.05 to 1, more preferably from 0.05 to 0.25.

The step of depositing the precursor sol film onto the main surface of the substrate may be carried out using any liquid-mediated conventional method, for example through dip coating, spray coating or spin coating, preferably through spin coating. This deposition step is preferably carried out under an atmosphere having a relative humidity (RH) varying from 40 to 80%.

The step of consolidating the film structure of the deposited precursor sol consists in completing the removal of the solvent or mixture of organic solvents from the precursor sol film and/or the possible water excess, and in continuing the condensation of some residual silanol groups that are present in the sol, typically by heating said film. This step is preferably carried out by heating at a temperature ≤150° C., preferably ≤130° C., more preferably ≤120° C. and even more preferably ≤110° C.

The pore-forming agent removal step may be partial or complete. Preferably, this step removes at least 90% by weight of the total weight of the pore-forming agent present in the film as a result of the preceding step, more preferably at least 95% by weight and even more preferably at least 99% by weight. Such removal is effected by any suitable method, for example through high temperature calcination (heating at a temperature typically of about 400° C.), but preferably through methods enabling to work at low temperatures, that is to say at a temperature ≤150° C., preferably ≤130° C., more preferably ≤120° C. and even more preferably ≤110° C. To be especially mentioned are the known methods, such as solvent extraction or supercritical fluid extraction, ozone degradation, plasma treatment for example with oxygen or argon, or corona discharge or photodegradation through exposure to the light radiation, especially UV.

Preferably, the extraction of the pore-forming agent is effected through extraction by means of an organic solvent, which enables to preserve the matrix and better control the porous film final thickness, as compared to calcination, and is more convenient for polymer substrates.

Several successive extractions may be needed to obtain the required extraction level.

In one embodiment, extraction is effected by means of an organic solvent or a mixture of organic solvents by dipping the formed and consolidated film into a solvent or a mixture of solvents, preferably organic solvents, brought to a temperature ≤150° C. A non toxic solvent is preferably used, such as acetone or ethanol. It is also possible to perform the extraction by using an acidic solvent, for example a combination of ethanol and hydrochloric acid.

In one preferred embodiment, the solvent extraction may also be efficiently carried out at room temperature, under stirring, using ultrasounds.

The various ways to remove the pore-forming agent are described in more detail in the application WO 2007/090983.

The mesoporous material matrix of the invention has a hydrophobic character, which is preferably obtained by implementing at least one of the two following embodiments.

In a first embodiment, the hydrophobic character may be provided to the matrix by introducing at least one hydrophobic precursor agent carrying at least one hydrophobic group into the precursor sol previously defined before the step b) of depositing a precursor sol film.

As used herein, "hydrophobic groups" are intended to mean combinations of atoms that are not prone to association with water molecules, especially through hydrogen bonding. These are typically non polar organic groups, with no charged atoms. Alkyl, phenyl, fluoroalkyl, perfluoroalkyl, (poly) fluoro alkoxy[(poly)alkylenoxy]alkyl, trialkylsilyloxy groups and hydrogen atom are therefore included in this category. Alkyl groups are the most preferred hydrophobic groups.

Hydrophobic precursor agents are preferably added to the precursor sol as a solution in an organic solvent and are preferably selected from compounds and mixtures of compounds of formulas (II) or (III) such as described in the application WO 2007/090983.

Preferred hydrophobic precursor agents are silanes, in particular alkoxysilanes, carrying at least one hydrophobic group that does directly contact the silicon atom. Suitable alkoxysilanes for use include alkyltrialkoxysilanes, such as methyltriethoxysilane (MTEOS, $CH_3Si(OC_2H_5)_3$), vinylalkoxysilanes, fluoroalkyl alkoxysilanes, and arylalkoxysilanes. The particularly preferred hydrophobic precursor agent is methyltriethoxysilane (MTEOS).

When this first embodiment is implemented, the molar ratio between the hydrophobic precursor agent and the inorganic precursor agent of formula (I) does vary from 10/90 to 50/50, more preferably from 20/80 to 45/55. Typically, the hydrophobic precursor agent carrying at least one hydrophobic group may account for 1 to 50% by weight of the precursor sol total weight.

In a second embodiment, which is the preferred embodiment, the hydrophobic character may be provided to the silica based matrix of the invention by treating the mesoporous film, which preparation has been described hereabove, with at least one hydrophobic reactive compound carrying at least one hydrophobic group. Said hydrophobic reactive compound is prone to react with the silanol groups of the matrix and treating through this compound results in a silica matrix, at least part of the silanol groups of which have been derivatized to hydrophobic groups.

The definition for hydrophobic groups is the same as the one used for the previously defined hydrophobic precursor agents.

This additional treating step, called "post-synthetic grafting", is carried out after the step of depositing the film of the precursor sol onto a support's main surface or, if present, after the step of consolidating the deposited film. It may be carried out during, after or even before the pore-forming agent removal step.

The hydrophobic reactive compounds bearing at least one hydrophobic group particularly suitable for the present invention are compounds of a tetravalent metal or metalloid, preferably silicon, comprising at least one function capable of reacting with the hydroxyl groups that remain in the film, in particular a Si—Cl, Si—NH—, Si—OR function, where R is an alkyl, preferably a $C_1$-$C_4$ alkyl group.

Preferably, said hydrophobic reactive compound is selected from compounds and mixtures of compounds of formula (V):

$$(R'^1)_3(R'^2)Si \qquad \qquad (V)$$

wherein:
$R'^1$ groups, being the same or different, represent saturated or unsaturated, hydrocarbon hydrophobic groups, preferably $C_1$-$C_8$ and more preferably $C_1$-$C_4$, for example an alkyl group, such as methyl or ethyl, a vinyl group, an aryl group, for example a phenyl group, optionally substituted, especially with one or more $C_1$-$C_4$ alkyl groups, or represent fluorinated or perfluorinated analog groups of the previously mentioned hydrocarbon groups, for example fluoroalkyl or perfluoroalkyl groups, or (poly)fluoro or perfluoro alkoxy[(poly)alkylenoxy]alkyl groups. Preferably, $R^{11}$ is a methyl group, $R^{12}$ represents a hydrolyzable group, preferably selected from alkoxy —O—R" groups, in particular $C_1$-$C_4$ alkoxy, —O—C(O)R" acyloxy where R" is an alkyl radical, preferably a $C_1$-$C_6$, preferably a methyl or an ethyl, an amino optionally substituted with one or more functional groups, for example an alkyl or a silane group, and halogens such as Cl, Br and I. These are preferably alkoxy groups, especially methoxy or ethoxy, chloro or —NHSiMe$_3$ groups.

As hydrophobic reactive compound, one may advantageously use fluoroalkyl chlorosilane, fluoroalkyl dialkyl chlorosilane, alkylalkoxysilane, fluoroalkyl alkoxysilane, fluoroalkyl dialkyl alkoxysilane, alkylchlorosilane such as trimethylchlorosilane, trialkylsilazane or hexaalkyldisilazane.

In a preferred embodiment, the hydrophobic reactive compound comprises a trialkylsilyl group, preferably a trimethylsilyl group and a silazane group, in particular a disilazane group. The most preferred hydrophobic reactive compound is 1,1,1,3,3,3-hexamethyldisilazane $(CH_3)_3Si$—NH—$Si(CH_3)_3$, abbreviated as HMDS.

This post-synthetic grafting step is described in more details in the applications US 2003/157311 and WO 2007/088312. It may be carried out on a porous coating, the matrix of which already has a hydrophobic character, due to the fact it has been obtained from a sol comprising a hydrophobic precursor agent.

However, the coatings of the invention have preferably a silica based matrix prepared from a sol devoid of any hydrophobic precursor agent, carrying at least one hydrophobic group. In this embodiment, the matrix of the mesoporous coating formed during the initial polymerization step is not a matrix possessing a hydrophobic character, but it acquires such character as a result of a hydrophobic post-treatment. In the context of the invention, a precursor agent being organosilane in nature and carrying at least one ammonium group, at least one hydrophobic group and a silicon atom having at least two hydrolyzable groups is not considered as being a hydrophobic precursor agent carrying at least one hydrophobic group, but as a precursor agent B.

The mesoporous coatings of the invention, which matrix has a hydrophobic character, show a better stability of their properties over time, in particular of their refractive index towards ambient humidity.

In their final state, the mesoporous films of the invention have a thickness which is not particularly limited and which may be adapted depending on the expected aim. Generally, they have a maximum thickness of about 1 µm, and generally a thickness ranging from 50 nm to 1 µm, preferably from 50 to 500 nm and more preferably from 50 to 150 nm. Several films may be deposited successively so as to obtain a multi-layered film having the desired thickness.

The preparation of mesoporous coatings having a silica based matrix is described in more details in the applications WO 2006/021698, WO 2007/088312 and WO 2007/090983 in the applicant's name, which are incorporated herein by reference.

The porous coatings according to the invention may be used for imparting antistatic properties to various items, transparent or not, such as, but without limitation, optical lenses or lens blanks, preferably ophthalmic lenses or lens blanks, optical fibers, glazing used for example in the field of aeronautics, in the field of building, transports (automotive . . . ), or in the field of interior arrangement.

The support onto which the porous films are deposited may be made from any solid, transparent or non transparent material, such as mineral glass, ceramics, glass-ceramic, metal or organic glass, for example a thermoplastic or a thermosetting plastic material. Preferably, the support is a substrate of mineral or organic glass, preferably transparent. More preferably, the support is a substrate made from a transparent plastic material.

Suitable thermoplastic materials for use as substrates, described in more details in the application WO 2007/090983, include (thio)(meth)acrylic (co)polymers, polycarbonates (PC), poly(thio)urethanes, polyol allylcarbonate (co)polymers, thermoplastic copolymers of ethylene and vinylacetate, polyesters, polyepisulfides, polyepoxides, copolymers of cycloolefins and combinations thereof. As used herein, a (co)polymer is intended to mean a copolymer or a polymer. As used herein, a (meth)acrylate is intended to mean an acrylate or a methacrylate.

Especially recommended substrates include those substrates obtained by (co)polymerization of diethyleneglycol bisallylcarbonate, marketed, for example, under the trade name CR 39® by the PPG Industries company (ORMA® lenses from ESSILOR).

The mesoporous films according to the invention may be formed at least on part of the main surface of a bare support (substrate), that is to say non coated, or a support already coated with one or more functional coating(s).

The article surface onto which the intended mesoporous antistatic coating should be deposited may optionally undergo a preliminary treatment so as to reinforce the adhesion of this coating. Suitably contemplated preliminary treatments include a corona discharge, a plasma treatment under vacuum, an ion beam or an electron beam treatment, or a treatment using an acid or a base.

Preferably, the support according to the invention is an ophthalmic lens substrate. In ophthalmic optics, it is well known to coat a main surface of a substrate made from a transparent organic material, for example an ophthalmic lens, with one or more functional coating(s) to improve the optical and/or mechanical properties of the final lens. Thus, the substrate main surface may be provided beforehand with a primer coating improving the impact resistance (impact-resistant primer) and/or the adhesion of the further layers in the end product, with an abrasion-resistant and/or scratch-resistant coating (hard coat), with an anti-reflection coating, with a polarized coating, with a photochromic coating, with an antistatic coating, with a tinted coating or with a stack made of two or more such coatings.

The mesoporous coating of the invention is preferably deposited onto an abrasion resistant and/or scratch-resistant coating, possessing preferably a high refractive index, typically ranging from 1.55 to 1.65, more preferably ranging from 1.55 to 1.60. The mesoporous coating may optionally be coated with coatings that are able to modify its surface properties, such as a hydrophobic and/or oleophobic layer (anti-fouling top coat).

The primer coatings intended to improve the impact resistance, the abrasion resistant and/or scratch-resistant coatings and the hydrophobic and/or oleophobic coatings may be selected from those described in the application WO 2007/088312.

In one preferred embodiment, the mesoporous film of the invention is a single-layer anti-reflection coating or is part of a multi-layer anti-reflection coating, optionally coated with a hydrophobic and/or oleophobic layer, especially an anti-reflection coating comprising alternating high refractive index layers (n≥1.55) and low refractive index layers (n≥1.50).

The refractive index of the mesoporous antistatic coating of the invention is less than or equal to 1.45, more preferably less than or equal to 1.40. It thus forms a low refractive index layer, as a result of the removal of the pore-forming agent from the mesopores. Such low refractive indices cannot be obtained with the antistatic coatings known from the prior art.

When it represents a single-layer anti-reflection coating, the mesoporous antistatic coating of the invention preferably has a thickness ranging from 80 to 130 nm, preferably from 90 to 120 nm, more preferably from 95 to 110 nm, so as to minimize reflection at a wavelength of about 540 nm, at which the eye sensitivity is maximum. This embodiment is particularly interesting, since a single layer provides the stack with both antistatic and antireflective properties.

It may in particular form the low refractive index layer of a bilayered anti-reflection coating, or also a Bragg mirror.

In a preferred embodiment of the invention, the mesoporous coating is formed on a high refractive index layer previously deposited on the substrate, and thus forms a low refractive index layer of a bilayered anti-reflection coating.

Said high refractive index layer is preferably obtained through hardening of a composition comprising a hydrolyzate of alkoxysilane, in particular epoxysilane, preferably epoxytrialkoxysilane, and of high refractive index colloids (n≥1.55) or precursors thereof. In particular, the colloids may be colloids of $TiO_2$, $ZrO_2$, $Sb_2O_5$, $SnO_2$ or $WO_3$. Its refractive index is preferably higher than 1.7, more preferably higher than 1.8, and its thickness does preferably vary from 10 to 200 nm.

Such an anti-reflection sol-gel coating as an advantage can be deposited using a liquid-mediated process, as opposed to traditional anti-reflection coatings based on dielectric layers, which have to be deposited through a treatment under vacuum.

Preferably, the mean reflection coefficient in the visible range $R_m$, (400-700 nm) and/or the mean light reflection coefficient $R_v$ (weighted average spectral reflection over the global visible spectrum between 380 and 780 nm) of an article coated with a mesoporous coating of the invention is or are less than 2% per article face, more preferably less than 1% per article face and even more preferably less than 0.75% per article face. Methods to obtain such values are well known to the persons skilled in the art. In the present application, the "mean reflection coefficient" $R_m$ and the "light reflection coefficient" $R_v$ are such as defined in the ISO 13666:1998 Standard and measured according to the ISO 8980-4 Standard.

As compared to the known antistatic coatings that are based on metal oxides or conductive polymers, the antistatic coatings of the invention advantageously are much less absorbent.

Preferably, the optical article of the invention does not absorb in the visible range or only absorbs a little in the visible range, which means, according to the present application, that the luminous transmittance thereof (Tv factor) (for the article as a whole) is higher than 95%, more preferably higher than 96% and even more preferably higher than 97%. The transmittance factor Tv is such as defined in the ISO13666 international Standard (1998) and is measured in accordance with the ISO8980-3 Standard. It is defined within the wavelength range of from 380 to 780 nm.

The present invention further relates to the use as an antistatic coating of a mesoporous coating possessing a silica based matrix functionalized by ammonium groups. Such a coating has a refractive index less than or equal to 1.5. Preferably, the matrix of the mesoporous coating has a hydrophobic character. Such hydrophobic character may have been given to it by implementing at least one of the two previously described embodiments.

The following examples illustrate hereafter the present invention without restraining the same. Unless otherwise mentioned, all percentages are expressed by weight. All refractive indices are expressed at λ=632.8 nm and T=20-25° C.

The solid contents were determined or calculated prior to adding the pore-forming agent. In other words, the pore-forming agent was not taken into account for calculating the solid content.

EXAMPLES

A) Reactants and Equipment Used for Synthesizing Porous Films

TEOS of formula $Si(OC_2H_5)_4$ has been employed as inorganic precursor agent of formula (I), Brij® 56 has been employed as pore-forming surfactant and hexamethyldisilazane (HMDS) as hydrophobic reactive compound. Two precursor agents of formula (II) have been used, i.e. N-trimethoxysilylpropyl-N,N,N-trimethylammonium chloride (TMAC, 50% solution in the methanol, provided by ABCR) and 3-aminopropyltriethoxysilane (APTES). The latter was used in combination with a 6M hydrochloric acid aqueous solution so that the APTES amino group is converted to an ammonium group.

Sols were prepared by using absolute ethanol as organic solvent and 0.1M diluted hydrochloric acid aqueous solution (so as to obtain a pH value of 1.25) as hydrolysis catalyst.

Coatings were deposited onto glasses comprising a substrate for an ORMA° lens from ESSILOR(CR-39®, 0.00 dioptres, except for the reflection measurements: −2.00 dioptres), having a refractive index equal to 1.50, a thickness of 1.1 mm, with a radius of curvature ranging from 80 to 180 mm and a diameter ranging from 65 to 70 mm. This substrate was coated with the abrasion-resistant and scratch-resistant coating disclosed in Example 3 of the patent EP 0614957 (with a refractive index of 1.48 and a thickness of 3.5 μm), based on GLYMO, DMDES, colloidal silica and aluminium acetylacetonate.

B) Characterizing the Mesoporous Coatings

The mesoporous coatings were characterized:
Through ellipsometry, to determine their refractive index. To that aim, the coatings are deposited onto silicon substrates polished on both sides.
Through infrared spectroscopy, to evaluate the surfactant extraction efficiency as well as the HMDS graft efficiency. For this purpose, the coatings are deposited onto silicon substrates polished on both sides.
Through reflectance spectroscopy, to evaluate the efficiency of the anti-reflection coating, should the mesoporous coating be sized to form an anti-reflection coating. For this purpose the coatings are deposited onto the CR-39® organic substrate described in §A). The mean reflection ($R_m$) over all the visible spectrum is determined. The reflection obtained by considering the eye spectral sensitivity curve ($R_v$) is also determined.

Through measurement of the discharge time, after an electrostatic charge has been applied to the lens surface according to the method described in the application WO 2008/015364. The measurements are effected under a controlled atmosphere at a temperature of 22° C. and 50% humidity. For this purpose the coatings are deposited onto the CR-39® organic substrate described in §A). The lenses are considered as being antistatic insofar as their discharge time is lower than 200 ms.

The coating thicknesses have been measured using a profile meter Tencor™.

C) Manufacture of Mesoporous Coatings Having a Silica Based Matrix that was Made Hydrophobic Through Post-Synthetic Grafting Example 1

TEOS/TMAC Matrix

The precursor sol was prepared by mixing together reagents and solvents in the following molar ratios: 1 TEOS: 0.15 TMAC: 22 EtOH: 5.75HCl (0.1M): 1.21 MeOH. The whole mixture was heated for 1 h at 60° C. to hydrolyze the silanes. After cooling, the pore-forming agent was added to the mixture in a molar ratio 1 TEOS:0.0851 Brij® 56. The composition was diluted in ethanol up to the final concentrations 1 TEOS:0.15 TMAC:1.21 MeOH:52.4 EtOH:5.75HCl (0.1M) and thereafter was set under stirring overnight prior to being deposited. It had a solid content of 5.13% by weight. The composition was then filtered through a syringe filter of 0.85 μm and diluted by a factor 2 (solid content ~2.78%) prior to being deposited through spin coating onto the substrate. Prior to undergo depositions, the substrate had been submitted to a surface preparation such as a corona treatment or a plasma treatment with oxygen to prevent any adhesion problem.

Thereafter, the film was submitted to a thermal treatment intended to advance the silica network polymerization degree (consolidation). The substrate coated with the film obtained in the hereabove paragraph 2 was thermally consolidated in an oven to 75° C. for 15 minutes then to 100° C. for 3 hours, then the pore-forming agent was removed through extraction by placing the substrate coated with the consolidated film in the isopropanol- or acetone-containing tank of an Elmasonic ultrasound delivery system at room temperature for 15 min.

The substrate coated with the mesoporous film was then introduced for 15 minutes into the tank of an Elmasonic ultrasound delivery system filled with HMDS, at room temperature. Thereafter, the lenses were rinsed with isopropyl alcohol to remove HMDS in excess. Such post-synthetic hydrophobation step is described in more details in the application WO 2007/088312.

Example 2

TEOS/APTES Matrix

A silica sol was prepared by mixing together reagents and solvents in the following molar ratios: 1 TEOS (45.8 g): 3.8 EtOH (39 g): 5HCl (0.1M) (19.9 g). The whole mixture was heated for 1 h at 60° C. to hydrolyze the silanes. After cooling, 50 g of this solution were collected and introduced into a container, and 34.7 g ethanol, 42 g water and 32 mL $HC_{1-6}M$ were then added thereto, under stirring. The resulting composition was stirred at room temperature for 5 minutes then cooled by placing the container in an ice bath. After approx. 15 minutes stirring, the temperature of the composition had reached 1-2° C.

15.665 g APTES were then added through a slow drop by drop, while controlling that the temperature of the mixture did not exceed 4° C., so as to limit the condensation rate of the sol and thus the formation of a precipitate. Once the addition APTES was complete, the stirring was continued for 5 min at 0-2° C., then for 15 min at room temperature. 8.91 g of the pore-forming agent Brij® 56 were then added to the mixture, and the stirring was continued overnight at room temperature.

The final composition comprised the reagents and solvents in the following molar ratios: 1 TEOS: 0.67 APTES: 10.9 EtOH: 1.82HCl (6M): 27.1$H_2O$: 0.124 Brij® 56. It had a solid content of 12.56% by weight.

The composition was then filtered through a syringe filter of 0.85 μm and diluted with ethanol by a factor 3 (solid content ~4.68%), stirred for 15 minutes prior to being deposited through spin coating onto the substrate (from 2000 to 2500 revolutions/min). A layer was obtained, with a high refractive index of about 1.5-1.51, as a result of the presence of the pore-forming agent in the mesopores. Prior to being coated, the substrate had been submitted to a surface preparation such as a corona treatment or a plasma treatment with oxygen to prevent any adhesion problem.

The consolidation of the film, the removal of the pore-forming agent through extraction and the post-synthetic grafting of the film with HMDS were then carried out as in Example 1.

Comparative Examples

TEOS/TMAC, TEOS/APTES or TEOS Matrices

The procedures implemented for preparing the articles in the comparative examples are the same as those of Examples 1 and 2. The differences are as follows.

The article of Comparative example C1, with a non porous coating, was obtained by following the same procedure as in Example 1, without using any pore-forming agent and without any HMDS-mediated post-synthetic grafting. The article of Comparative example C11 differs from the one of Example 1 in that it was obtained without any HMDS-mediated post-synthetic grafting.

The article of Comparative example C2, with a non porous coating, was obtained by following the same procedure as in Example 2, without using any pore-forming agent and without any HMDS-mediated post-synthetic grafting, and by using a dilution factor by 2 (solid content in the composition: 9.72% by weight) or without any dilution (solid content in the composition: 4.86% by weight). The article of Comparative example C22 differs from the one of Example 2 in that it was obtained without any HMDS-mediated post-synthetic grafting.

The article of Comparative example C3 differs from the one of Examples 1 and 2 in that the only inorganic precursor agent used is TEOS. The precursor sol comprised 14.36 g TEOS, 79.42 g ethanol, 6.2 g hydrochloric acid 0.1N, and 3.49 g of the pore-forming agent Brij® 56 (weight ratio 1 TEOS:0.074 Brij® 56).

The article of Comparative example C4, with a non porous coating, was obtained by following the same procedure as in Example C3, without using any pore-forming agent and without any HMDS-mediated post-synthetic grafting.

The article of Comparative example C5 differs from that of Comparative example C3 in that it was obtained without any HMDS-mediated post-synthetic grafting.

D) Results

Table 1 enables to compare the performances of the lenses of Examples 1, 2 and of Comparative examples as regards their refractive index and discharge time.

When various thicknesses are given in the same example, these have been obtained by slightly modifying the solid content of solutions and/or the rates of centrifugation.

TABLE 1

| Example | Precursor agents | Pore-forming agent | HMDS-mediated treatment | Refractive index of the coating | Thickness of the coating (nm) | Discharge time (ms) |
|---|---|---|---|---|---|---|
| 1 | TEOS/TMAC | Yes | Yes | 1.30 | 100 | 173 |
|   |   |   |   | 1.30 | 75 | 182 |
| Comparative C1 | TEOS/TMAC | No | No | 1.47 | 100 | 132 |
| Comparative C11 | TEOS/TMAC | Yes | No | 1.38 | 110 | 79 |
|   |   |   |   | 1.35 | 85 | 110 |
| 2 | TEOS/APTES | Yes | Yes | 1.40 | 186 | 15 |
|   |   |   |   | 1.40 | 100 | 126 |
| Comparative C2 | TEOS/APTES | no | No | 1.51 | 194 | 51 |
| Comparative C22 | TEOS/APTES | Yes | No | 1.47 | 194 | 22 |
|   |   |   |   | 1.48 | 89 | 18 |
| Comparative C3 | TEOS | Yes | Yes | 1.32 | 229 | 8280 |
|   |   |   |   | 1.31 | 98 | 1395 |
| Comparative C4 | TEOS | No | no | 1.44 | 93 | 2703 |
| Comparative C5 | TEOS | Yes | No | 1.41 | 163 | 289 |
|   |   |   |   | 1.43 | 76 | 354 |

E) Comments about the Results of Table 1

1) Antistatic Properties

A TEOS-based matrix (single precursor agent) does not possess antistatic properties, whatever porous or non porous, having undergone a hydrophobic functionalization, or not (examples C3-C5).

By contrast, with thicknesses of about 100-200 nm, the matrices resulting from TEOS and TMAC or APTES precursor mixtures (ammonium group-containing precursors) have all antistatic properties, whatever porous or non porous, having undergone a hydrophobic functionalization, or not (Examples 1, 2, C1, C11, C2, C22). Generally speaking, the higher the antistatic layer thickness, the lower the discharge time, as a result of the increase in the ionic species global amount, which enable to disperse the electrostatic charges more rapidly.

2) Effect of the Hydrophobic Functionalization on the Refractive Index

With no HMDS-mediated hydrophobic functionalization, the refractive indices of the porous layers are higher. The IR spectra obtained show that the removal of the pore-forming agent through solvent extraction was efficient. The higher refractive indices are therefore not related to an insufficient removal of the pore-forming agent but could be explained, without wishing to be bound by any theory, by humidity condensation within the pores. A way to avoid such a condensation, and thus to reduce the refractive index of the coating, is to hydrophobically functionalizing the porous layer, like in the present case with HMDS.

3) Effect of the Hydrophobic Functionalization on the Antistatic Properties

The HMDS-mediated post-treatment of a matrix generally induces an increase in the discharge time. Without wishing to be bound by any theory, the lower discharge time in matrices which could be observed with matrices not functionalized by HMDS may be due to the presence of humidity in the pores which induces a quicker electrostatic charge dissipation. The influence of humidity on the electrostatic properties of a coating is well known in the literature.

The hydrophobic functionalization of the system would therefore limit the presence of water within the pores, inducing an increase in the discharge time.

In Examples 1 and 2, the hydrophobic functionalization does not induce any increase in the discharge times above 200 ms, so that the article retains antistatic properties.

As a conclusion, the presence of charged species (ammonium +counter-ion) within the matrix of a mesoporous coating enables to obtain a coating possessing simultaneously a low refractive index (in the present case lower than 1.4) and antistatic properties.

F) Analyzing the Influence of the Presence of Ammonium Groups within the Matrix on the Antistatic Properties An article prepared as in Example C22 but possessing a 400 nm-thick mesoporous coating was dipped into a 0.01 M soda aqueous solution for 30 minutes, in order to deprotonate the ammonium groups present within the matrix. The discharge time values before and after the neutralization are given in Table 2.

TABLE 2

| Precursor agents | Pore-forming agent | HMDS-mediated treatment | Thickness of the coating (nm) | Discharge time before NaOH 0.01M washing (ms) | Discharge time after NaOH 0.01M washing (ms) |
|---|---|---|---|---|---|
| TEOS/APTES | Yes | No | 400 | 27.2 | 350 |

Table 2 shows how the conversion of the ammonium groups to amino groups (non charged) leads to a significant increase in the discharge time above 200 ms, that is to say causes the antistatic properties to disappear. Therefore it is important to use a charged species within the mesoporous matrix.

G) Evaluating the Antireflection Properties

The optical properties of the coating of Example 1 (deposited onto a CR-39® organic substrate with a refractive index of 1.5, provided with an abrasion-resistant coating), possessing a thickness of 100 nm and a discharge time of 173 ms, are given in Table 3.

(Properties of a monolayer on a single face of the substrate).

TABLE 3

| Refractive index of the coating | Hue angle H (°) | Chroma C* | $R_m$ (%) | $R_v$ (%) |
|---|---|---|---|---|
| 1.30 | 35 | 4.2 | 0.53 | 0.45 |

Because of its relatively low mean reflection coefficients Rm and Rv in the visible range, this mesoporous antistatic coating is an efficient single-layer anti-reflection coating. It forms a coating having a 2/4 optical thickness for the wavelength λ=548 nm.

The reflection curve of the sample between 380 and 780 nm is illustrated on FIG. 1.

The invention claimed is:

1. A method for manufacturing a substrate coated with a mesoporous antistatic film, comprising:
   a) preparing a precursor sol of a mesoporous antistatic film comprising:

at least one inorganic precursor agent A selected from compounds of formula:

$$Si(X)_4$$

wherein the X groups independently are hydrolyzable groups or a hydrolyzate of such precursor agent;
at least one precursor agent B selected from organosilanes comprising:
  a silicon atom carrying at least two hydrolyzable groups; and
  at least one ammonium group;
  or a hydrolyzate of such precursor agent;
at least one organic solvent, at least one pore-forming agent, and water;
the B compound / A compound molar ratio ranging from 0.1 to 0.8;
b) depositing the precursor sol to form a precursor sol film onto a main surface of the substrate;
c) consolidating the deposited film;
d) removing the pore-forming agent from the film resulting from the previous step; and
e) recovering a mesoporous antistatic film having a refractive index lower than or equal to 1.45;
the method further comprising:
(i) a step of treating the film after step b) or after step c), with at least one hydrophobic reactive compound carrying at least one hydrophobic group; and/or
(ii) a step of introducing at least one hydrophobic precursor agent carrying at least one hydrophobic group into the precursor sol before the step b) of depositing the precursor sol film.

2. The method of claim 1, wherein at least one X group is an alkoxy, acyloxy or halogen group.

3. The method of claim 1, wherein the precursor sol of a mesoporous antistatic film further comprises a hydrolysis catalyst for the X groups.

4. The method of claim 1, wherein the precursor agent B is a compound, or a hydrolyzate thereof, of formula:

$$R_n Y_m Si(X')_{4-n-m} \quad (II)$$

wherein the Y groups independently are monovalent organic groups bound to silicon through a carbon atom and comprise at least one ammonium group, the X' groups independently are hydrolyzable groups, R is a monovalent organic group bound to silicon through a carbon atom, n and m being integers such that m =1 or 2 with n+m =1 or 2.

5. The method of claim 4, wherein the ammonium group is located at the terminal position of the Y group.

6. The method of claim 4, wherein the Y group is a group of formula:

$$W^- \quad R^2-\overset{R^1}{\underset{R^3}{\overset{|}{N^+}}}-(CH_2)_z- \quad (III)$$

wherein z is an integer, $R^1$, $R^2$ and $R^3$ independently represent hydrogen atoms, aryl groups, aralkyl groups or linear or branched alkyl groups, and W is an anion.

7. The method of claim 6, wherein z ranges from 2 to 20.

8. The method of claim 6, wherein $R^1$, $R^2$ and $R^3$ independently represent alkyl groups having from 1 to 20 carbon atoms.

9. The method of claim 1, wherein the pore-forming agent is a polyethylene glycol alkyl monoether of formula:

$$H(OCH_2CH_2)_n OR^1 \quad (IV)$$

wherein $R^1$ is a linear or branched alkyl group and n is an integer from 1 to 200.

10. The method of claim 1, wherein the precursor sol does not contain any hydrophobic precursor agent carrying at least one hydrophobic group.

11. The method of claim 1, wherein the hydrophobic reactive compound is selected from compounds and mixtures of compounds of formula:

$$(R'^1)_3(R'^2)Si \quad (V)$$

wherein:
  the $R'^1$ groups independently represent saturated or unsaturated, hydrophobic hydrocarbon groups; and
  $R'^2$ represents a hydrolyzable group.

12. The method of claim 1, wherein the substrate is a substrate for an optical lens or an optical lens blank.

13. The method of claim 1, wherein the mesoporous coating has a thickness ranging from 50 nm to 1 μm.

14. The method of claim 13, wherein the hydrophobic reactive compound is a fluoroalkyl chlorosilane, fluoroalkyl dialkyl chlorosilane, alkylalkoxysilane, fluoroalkyl alkoxysilane, fluoroalkyl dialkyl alkoxysilane, alkylchlorosilane, trialkylsilazane, or hexaalkyldisilazane.

15. The method of claim 13, wherein the mesoporous coating has a thickness ranging from 50 to 150 nm.

* * * * *

UNITED STATES PATENT AND TRADEMARK OFFICE
CERTIFICATE OF CORRECTION

PATENT NO. : 9,266,772 B2  
APPLICATION NO. : 13/390316  
DATED : February 23, 2016  
INVENTOR(S) : Mamonjy Cadet et al.

Page 1 of 1

It is certified that error appears in the above-identified patent and that said Letters Patent is hereby corrected as shown below:

In the claims,

Claim 23, Column 20, Line 22:

Delete "wherein $R^{l}$" and replace with -- wherein $R^1$ --.

Signed and Sealed this  
Fifth Day of July, 2016

Michelle K. Lee  
*Director of the United States Patent and Trademark Office*